(12) United States Patent
Moon

(10) Patent No.: US 7,706,846 B2
(45) Date of Patent: Apr. 27, 2010

(54) MOBILE TERMINAL CAPABLE OF RE-SELECTING CELL IN ACCORDANCE OF RESIDUAL AMOUNT OF BATTERY AND METHOD OF OPERATING THE SAME

(75) Inventor: Sung Jun Moon, Austin (US)

(73) Assignee: LG Electronics Inc., Seoul (KR)

( * ) Notice: Subject to any disclaimer, the term of this patent is extended or adjusted under 35 U.S.C. 154(b) by 630 days.

(21) Appl. No.: 11/537,481

(22) Filed: Sep. 29, 2006

(65) Prior Publication Data

US 2007/0123265 A1    May 31, 2007

(30) Foreign Application Priority Data

Sep. 29, 2005   (KR)  ....................... 10-2005-0091434

(51) Int. Cl.
 H04B 1/38 (2006.01)
 H04W 36/00 (2006.01)
 H04W 40/00 (2006.01)
(52) U.S. Cl. .................. 455/574; 455/441; 455/443; 455/444; 455/449
(58) Field of Classification Search ................. 455/574
 See application file for complete search history.

(56) References Cited

U.S. PATENT DOCUMENTS

| | | | | |
|---|---|---|---|---|
| 5,870,685 | A * | 2/1999 | Flynn | 455/573 |
| 2001/0031638 | A1 * | 10/2001 | Korpela et al. | 455/449 |
| 2004/0022217 | A1 * | 2/2004 | Korpela et al. | 370/335 |

FOREIGN PATENT DOCUMENTS

| | | |
|---|---|---|
| EP | 1 439 725 A1 | 1/2003 |
| KR | 10-2003-0062869 A | 7/2003 |
| KR | 10-2005-0078947 A | 8/2005 |
| WO | WO 01/43462 A2 | 6/2001 |

OTHER PUBLICATIONS

Universal Mobile Telecommunications System (UMTS) ETSI Standards, European Telecommunications Standards Institute, Sophia-Antipo, FR, [Online] vol. 3-R2, No. V30, Jun. 2000, pp. 1-46, XP014008624 ISSN: 0000-0001 Retrieved from the Internet: URL: www.etsi.org. [retrieved on Feb. 22, 2007] pp. 17-21; pp. 25-27.
3G TS 25.304 V3.3.0: 3rd Generation Partnership Project; Technical Specification Group Radio Access Network; UE Procedures in Idle Mode and Procedures for Cell Reselection in Connected Mode (Release 1999).

* cited by examiner

*Primary Examiner*—Lester Kincaid
*Assistant Examiner*—Yu (Andy) Gu
(74) *Attorney, Agent, or Firm*—Lee, Hong, Degerman, Kang & Waimey

(57) ABSTRACT

A mobile terminal and method for re-selecting a cell in accordance with a residual amount of a battery capacity so that the number of times or re-selecting a cell is reduced in accordance with the residual amount of the battery capacity. Information on a plurality of cells having different priorities in a hierarchical cell structure (HCS) is received and a cell size measuring reference is re-set in accordance with the received cell information or the residual amount of the battery capacity so that the mobile terminal is connected to a cell selected among the cells measured in accordance with the re-set measuring reference.

27 Claims, 6 Drawing Sheets

MOBILE TERMINAL CAPABLE OF RE-SELECTING CELL IN ACCORDANCE OF RESIDUAL AMOUNT OF BATTERY AND METHOD OF OPERATING THE SAME

CROSS-REFERENCE TO RELATED APPLICATIONS

Pursuant to 35 U.S.C. §119(a), this application claims the benefit of earlier filing date and right of priority to Korean Application No. 91434/2005, filed on Sep. 29, 2005, the contents of which are hereby incorporated by reference herein in their entirety.

FIELD OF THE INVENTION

The present invention relates to a mobile terminal capable of re-selecting a cell in accordance with a residual amount of battery capacity and a method of operating the same, and more particularly, to a mobile terminal capable of re-selecting a cell in accordance with a residual amount of battery capacity so that a cell measuring reference is re-selected in accordance with the residual amount of the battery capacity to reduce the number of times of re-selecting a cell in accordance with change in the position of the mobile terminal and a method of operating the same.

DESCRIPTION OF THE RELATED ART

In general, during change in position of a cell, a mobile terminal re-selects a cell between the cells adjacent to a connected cell in accordance with intensity of a received signal and data transmission rate of the connected cell and whether an internal trigger is generated by a change in position of the mobile terminal.

At this time, as illustrated in FIG. 1, during change in position from a currently connected cell C1, the mobile terminal 70 re-selects the cell C2 whose received signal has the largest intensity between the cells adjacent to the connected cell in accordance with the intensity of the received signal and the data transmission rate of the connected cell to transmit and receive data.

Also, in a hierarchical cell structure (HCS) including a plurality of cells having at least one difference of priorities, the mobile terminal 70 selects the cell having a small radius so that the intensity of the receiving signal and the data transmission rate of the cell are as large as the connected cell rather than the cell having a large radius in order to improve the data transmission rate.

At this time, during change in position from a connected cell to another cell, the mobile terminal 70 re-selects the connected cell among the cells having priorities higher than the priority of the connected cell and radiuses equal to or smaller than the radius of the connected cell so that the intensity of the received signal is maintained.

According to a conventional mobile terminal cell re-selection, as illustrated in FIG. 2, during change in position from a currently connected cell C1 to another cell C4, when the intensity of the receiving signal of the connected cell C1 is transmitted to be less than an intensity threshold value in accordance with change in the position of the mobile terminal, the mobile terminal 70 re-selects another cell C2 adjacent to the cell C1 as the connected cell.

Also, the mobile terminal 70 re-selects a cell C3 adjacent to the cell C2 as the connected cell during change in position from the re-connected cell C2 and re-selects a cell C4 adjacent to the cell C2 as the connected cell during another change in position.

However, the conventional mobile terminal 70 sets the cell measuring reference in accordance with the data transmission rate of the received cell information or whether an internal trigger is generated by the high speed movement of the mobile terminal and re-selects a cell among the cells measured in accordance with the measuring reference so that the cell is re-selected regardless of a consumption amount of a battery.

Also, the mobile terminal 70 re-selects a cell among the cells having small radiuses and high priorities so that the consumption amount of the battery increases accordingly as the number of times of re-selecting a cell increases and that the battery is quickly consumed when the position of a cell is frequently changed.

Therefore, there is a need for a mobile terminal capable of re-selecting a cell and conserving battery consumption when the mobile terminal has a low amount of battery capacity. The present invention addresses these and other needs.

SUMMARY OF THE INVENTION

An object of the present invention is to provide a mobile terminal capable re-selecting a cell size measuring reference in accordance with a residual amount of a battery capacity of a mobile terminal as well as received cell information, and re-selecting the cell in accordance with the residual amount of battery capacity so that cells of low priorities are measured when the residual amount of the battery is small to reduce the number of times of re-selecting a cell and a method of operating the same.

In order to achieve the above object, there is provided a mobile terminal capable of re-selecting a cell in accordance with a residual amount of a battery capacity, the mobile terminal comprising a communication module for receiving information on a plurality of cells having different priorities in a hierarchical cell structure (HCS) and for transmitting data to and receiving data from a connected cell, and a controller for measuring connectable cells in accordance with the residual amount of the battery capacity so that the mobile terminal is connected to a cell selected among the measured cells.

The priorities are determined in accordance with the radiuses of the other cells based on the connected cell. The priorities are determined so that cells of regions having radiuses larger than the radius of the region of the connected cell are determined to have low priorities and that cells of regions having radiuses smaller than the radius of the region of the connected cell are determined to have high priorities.

The controller comprises a setting unit for re-setting a cell size measuring reference value for measuring connectable cells in accordance with the received cell information or the residual amount of the battery capacity, and a data processor for re-selecting a connected cell among the measured cells in accordance with the re-set cell size measuring reference.

The setting unit sets a cell size measuring reference so that cells of priorities higher than or lower than the priority of the connected cell are measured in accordance with the residual amount of the battery capacity.

When the residual amount of the battery capacity is less than a battery capacity measuring reference value, the setting unit sets the cell size measuring reference so that cells of priorities lower than or equal to the priority of the connected cell are measured.

In another aspect of the present invention, when the mobile terminal moves at high speed, the setting unit sets the cell size measuring reference so that cells of priorities lower than the priority of the connected cell are measured.

The data processor evaluates cells of priorities lower than the priority of the connected cell among the connectable cells in accordance with the cell size measuring reference.

When the intensity of the receiving signal of the connected cell is less than an intensity threshold value, the data processor re-selects a connected cell among the measured cells. The data processor re-selects the connected cell among cells of low priorities selected among the measured cells.

The mobile terminal further comprises a determining unit for determining the intensity of the receiving signal of the connected cell or the residual amount of the battery capacity of the mobile terminal.

The determining unit determines the data transmission rate Ec/No of the connected cell or whether internal trigger is generated by the high speed movement of the mobile terminal.

Furthermore, the determining unit determines cell measuring priorities of cells adjacent to the connected cell when cell information is received from the adjacent cells.

In order to achieve the above object, there is also provided a method of operating a mobile terminal capable of re-selecting a cell in accordance with a residual amount of a battery capacity, the method comprising the steps of (a) measuring the residual amount of the battery capacity when internal trigger is not generated by high speed movement of the mobile terminal, (b) re-setting a cell size measuring reference in accordance with the measured residual amount of the battery capacity to measure cells adjacent to a connected cell in accordance with the cell size measuring reference, and (c) re-selecting a cell among the measured cells in accordance with the intensity of the receiving signal of the connected cell.

The step (b) comprises the step of comparing the residual amount of the battery capacity with a previously set battery capacity measuring reference value.

Step (b) further comprises the step of measuring cells of priorities lower than the priority of the currently connected cell when it is determined that the residual amount of the battery capacity is less than the battery capacity measuring reference value and measuring cells of priorities higher than the priority of the connected cell when it is determined that the residual amount of the battery capacity is more than the battery capacity measuring reference value.

The step (c) comprises the step of comparing the intensity of the receiving signal of the currently connected cell with a previously set intensity threshold value.

In the step (c), when it is determined that the intensity of the receiving signal of the cell is less than the previously set intensity threshold value, a cell is re-selected among the measured cells.

The method of operating the mobile terminal further comprises the step of receiving information on cells adjacent to the connected cell to read the received information.

The method of operating the mobile terminal further comprises the step of determining cell priorities in accordance with the received cell information.

In the mobile terminal capable of re-selecting the cell in accordance with the residual amount of the battery capacity of the present invention and the method of operating the same. The cell is re-selected in accordance with the information received from the connected cell or the cells adjacent to the connected cell and the cell size measuring reference is re-set so that the cells of low priorities are measured in accordance with the residual amount of the battery capacity. Therefore, it is possible to reduce the number of times of re-selecting the cell and to thus reduce the consumption amount of the battery.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

The present invention relates to a mobile terminal capable for re-selecting a cell in accordance with a residual amount of battery capacity and a method of operating the same. Although the present invention is illustrated with respect to a mobile communication terminal, it is contemplated that the present invention may be utilized with other mobile devices, as well.

Description of the present invention will now be given in detail with reference to the FIGS. 3 to 7 with respect to the mobile terminal capable of re-selecting a cell in accordance with a residual amount of battery capacity. Here a cell size measuring reference is re-selected in accordance with the residual amount of the battery capacity to reduce the number of times of re-selecting a cell in accordance with change in the position of the cell. The present invention improves the data reception rate of a mobile terminal when the residual amount of battery capacity is less than a battery capacity measuring reference value.

According to the embodiments, a plurality of mobile terminals may exist and a plurality of connectable cells may be available to operate according to the invention as presented below.

Figure 1:
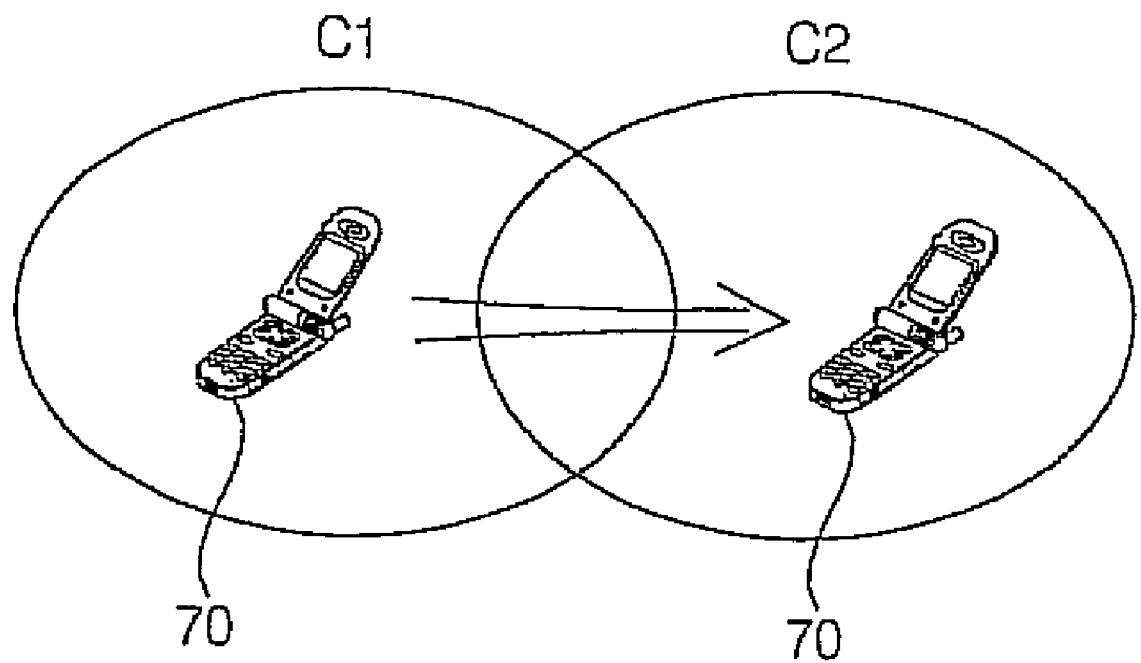
FIG. 1 illustrates a change in position of a conventional mobile terminal between cells.
Figure 2:
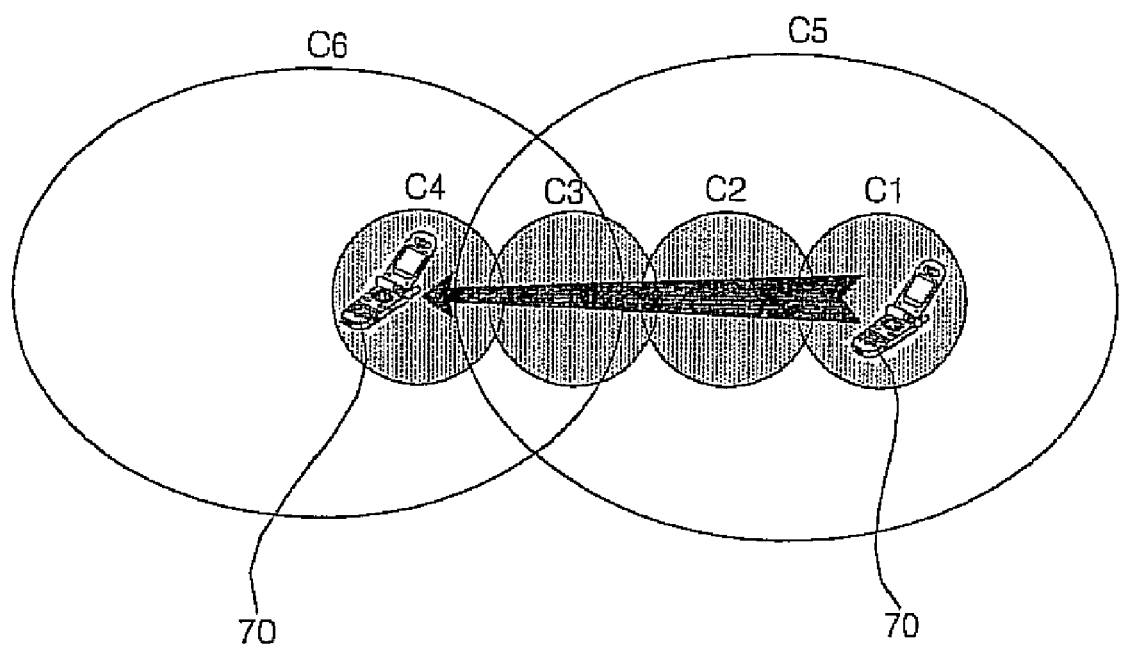
FIG. 2 illustrates multiple cell re-selections as a mobile terminal changes position in a conventional system.
Figure 3:
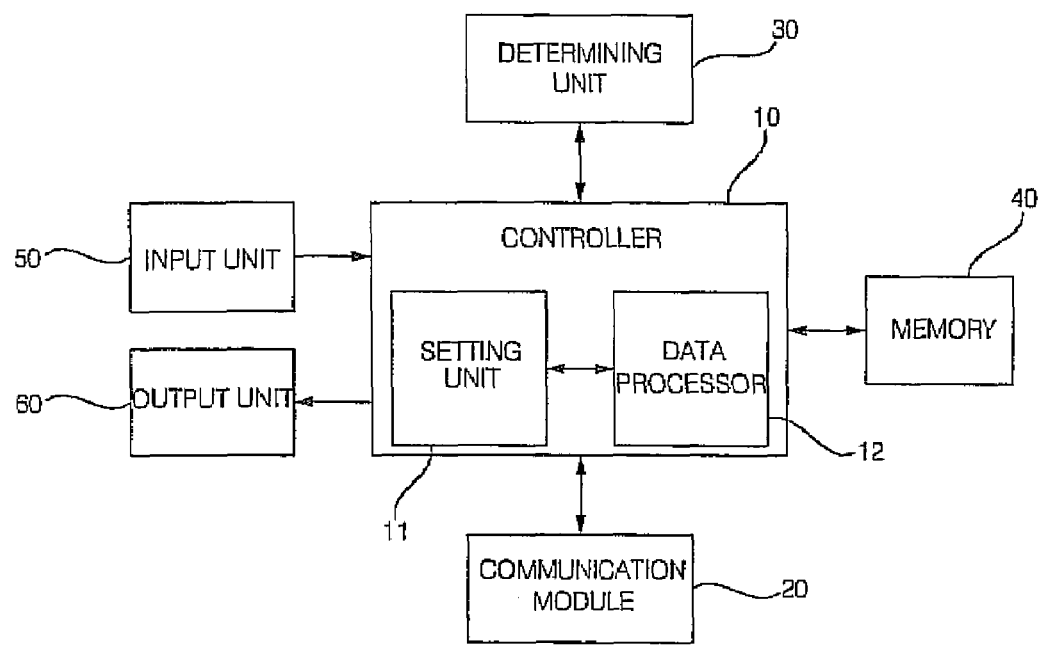
FIG. 3 is a block diagram illustrating the structure of a mobile terminal according to the present invention.
Figure 4:
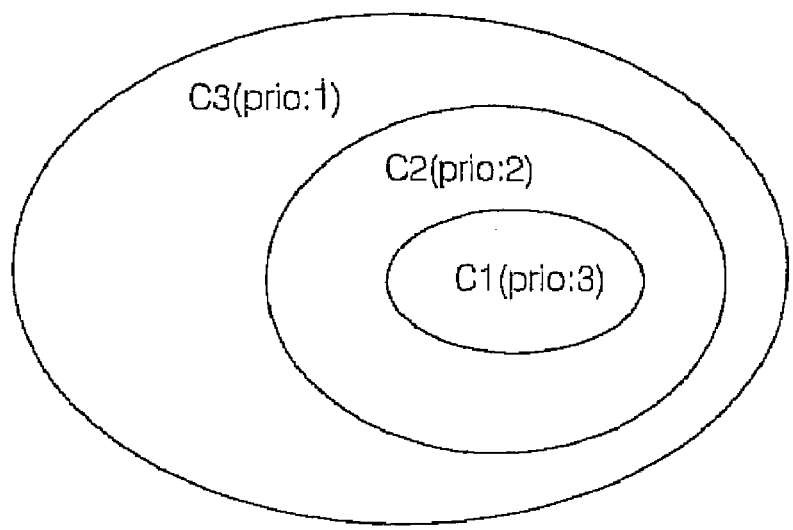
FIG. 4 illustrates a priority cell structure for a mobile terminal according to a first embodiment of the present invention.
Figure 5:
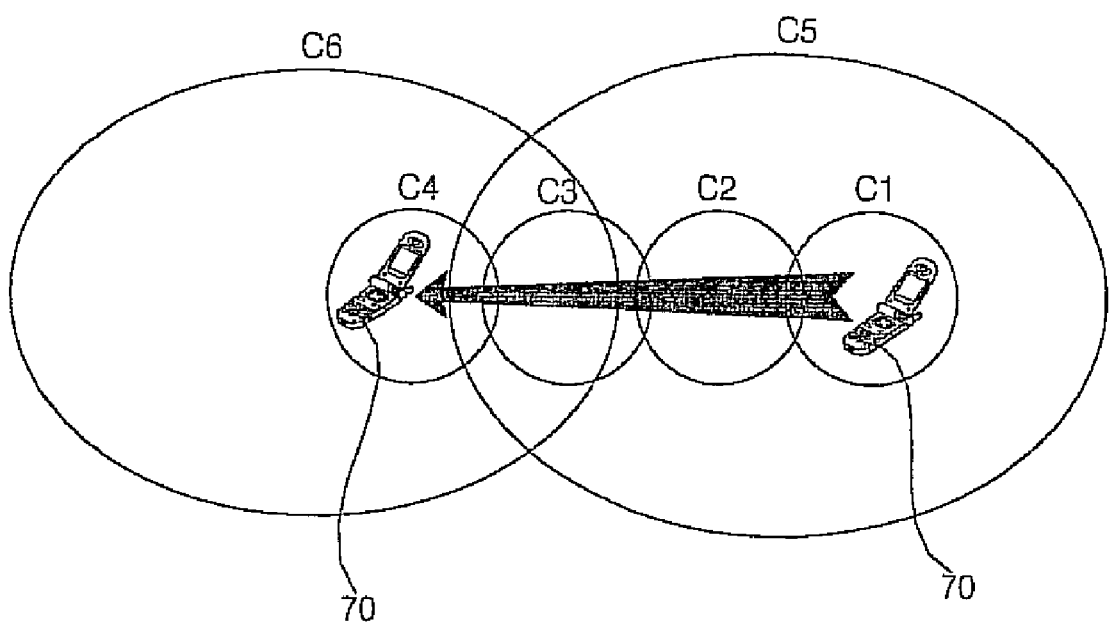
FIG. 5 illustrates a priority cell structure for a mobile terminal according to a second embodiment of the present invention.
Figure 6:
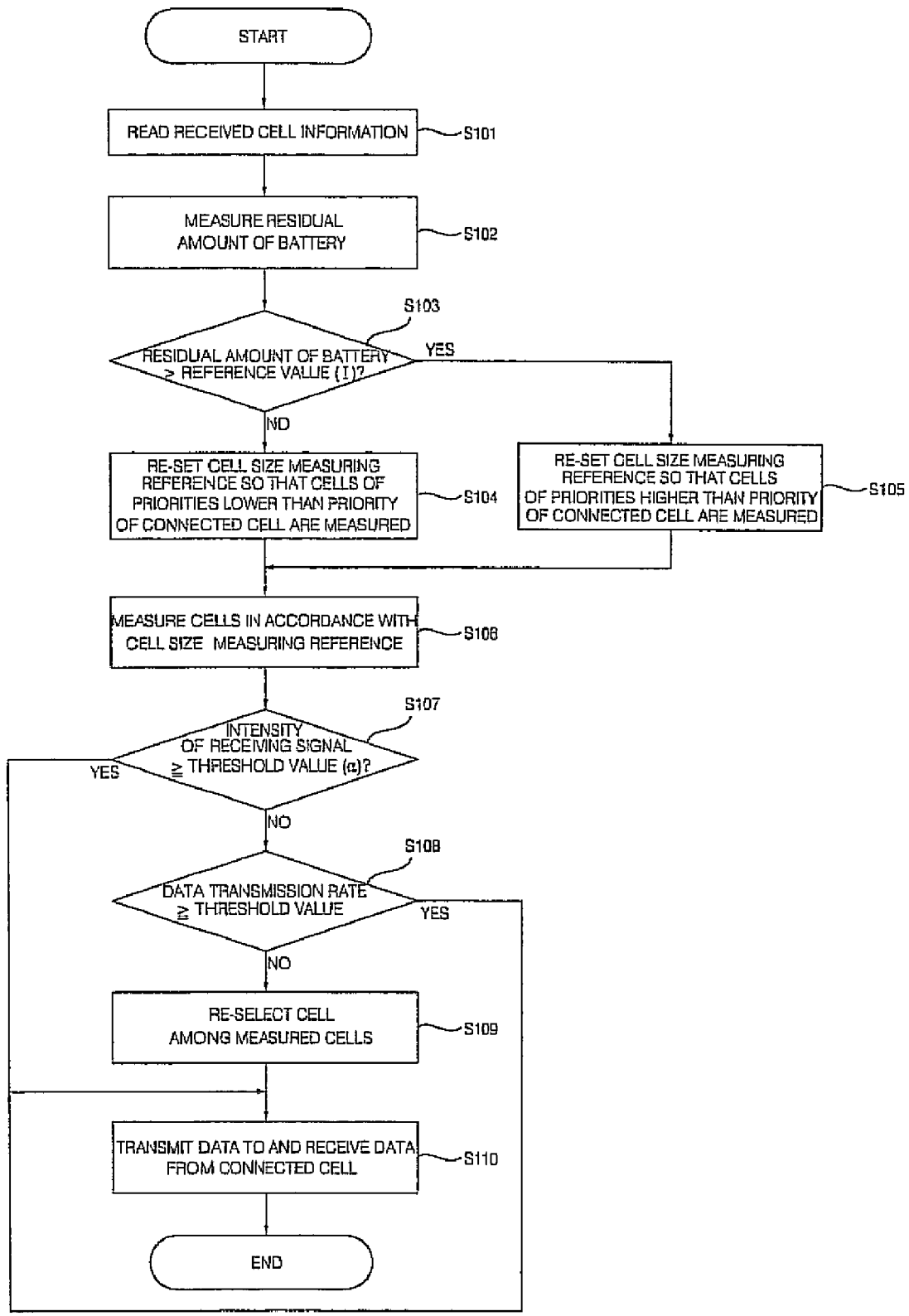
FIG. 6 is a flowchart illustrating a method of operating the mobile terminal according to the present invention.
Figure 7:
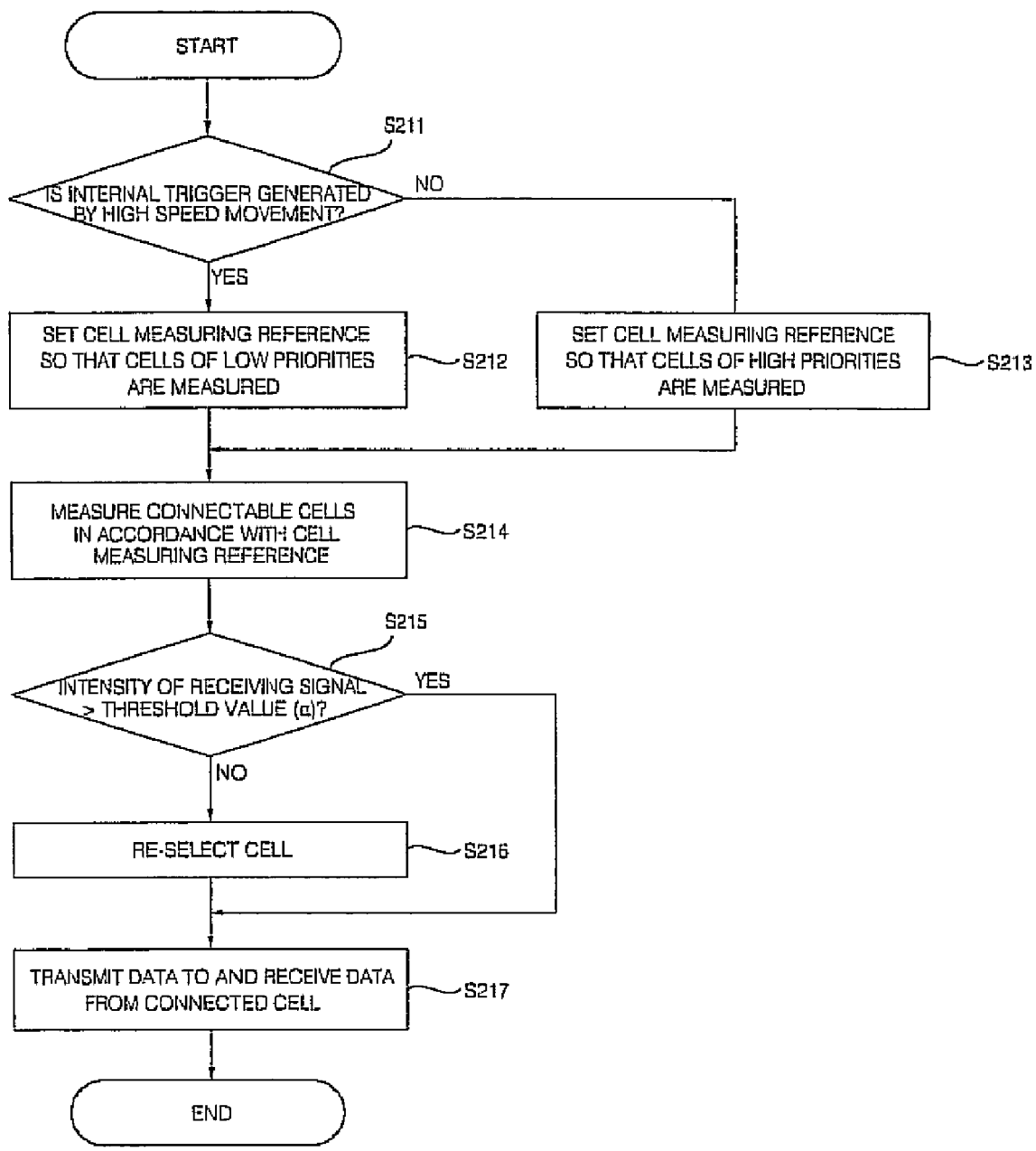
FIG. 7 is a flowchart illustrating a method of operating the mobile terminal according to another embodiment of the present invention.

FIG. 3 is a block diagram illustrating the structure of a mobile terminal according to the present invention. FIG. 4 illustrates a priority cell structure for a mobile terminal according to a first embodiment of the present invention. FIG. 5 illustrates a priority cell structure for a mobile terminal according to a second embodiment of the present invention. FIG. 6 is a flowchart illustrating a method of operating the mobile terminal according to the present invention. FIG. 7 is a flowchart illustrating a method of operating the mobile terminal according to another embodiment of the present invention.

In an embodiment of the present invention, as illustrated in FIG. 3, a mobile terminal capable of re-selecting a cell in accordance with a residual amount of a battery capacity includes an input unit 50 to which data are input, an output unit 60 on which received data such as received cell information are displayed, a communication module 20 for receiving information on a plurality of cells having different priorities in a hierarchical cell structure (HCS) and for transmitting data to and receiving data from a connected cell. The HCS priorities are determined in accordance with the radiuses of a plurality of adjacent connectable cells based on a connected cell. The mobile terminal further includes a memory 40 in which the cell information received through the communication module 20 is stored and a controller 10 for measuring connectable cells in accordance with the received cell information or the residual amount of the battery capacity, so that the mobile terminal is connected to a cell selected among the measured cells.

As shown in FIG. 3, a determining unit 30 is included in the mobile terminal of the present invention for determining an intensity level of a receiving signal of a connected cell or the residual amount of the battery capacity of the mobile terminal.

The communication module 20 receives information on connectable cells and transmits data to and receives data from the connected cell in accordance with the received cell information. The cell information received through the communication module 20 is stored in the memory 40. That is, the cell information, such as the frequency bands and priorities of the cells received through the communication module 20 is stored in the memory 40.

Accordingly, set data of the mobile terminal are stored in the memory 40, as well. When the connectable cells are measured, a cell size measuring reference, a battery capacity measuring reference value, and an intensity threshold value for comparing the intensity of the receiving signal of the connected cell are stored in the memory 40.

In the present embodiment, the determining unit 30 determines the cell information received from the connected cell or other cells adjacent to the connected cell when the mobile terminal is connected to the cell. The determining unit 30 determines the data transmission rate Ec/No of the currently connected cell and determines whether internal trigger is generated by the high speed movement of the mobile terminal. The determining unit 30 determines the cell measuring priorities of the cells adjacent to the connected cell. Also, the determining unit 30 determines the residual amount of the battery capacity of the mobile terminal to compare the measured residual amount of the battery capacity with the battery capacity measuring reference value.

The controller 10 includes a setting unit 11 for re-setting a reference for measuring the connectable cells in accordance with the received cell information or the residual amount of the battery capacity and a data processor 12 for re-selecting a connected cell among the cells measured in accordance with the re-set cell size measuring reference.

The data processor 12 reads the cell information received through the communication module 20 to store the read cell information in the memory 40. At this time, the data processor 12 evaluates connectable cells by the determination result of the determining unit 30 obtained in accordance with the read cell information or re-selects a cell selected among the measured cells as a connected cell.

Here, the data processor 12 evaluates connectable cells when it is determined by the determining unit 30 that the intensity of the receiving signal or the data transmission rate Ec/No of the connected cell is less than the data transmission rate threshold value to try connection to the corresponding cells through the communication module 20. Also, the data processor 12 evaluates the connectable cells when it is determined that internal trigger is generated by the high speed movement of the mobile terminal 70 to try connection to the measured cells.

In the case where it is determined that the intensity of the receiving signal or the data transmission rate Ec/No of the connected cell is more than the data transmission rate threshold value in accordance with the received cell information or that the internal trigger is not generated by the high speed movement of the mobile terminal, when it is determined by the determining unit 30 that the residual amount of the battery capacity is less than the battery capacity measuring reference value, the data processor 12 evaluates adjacent connectable cells in accordance with the cell size measuring reference.

When the residual amount of the battery capacity of the mobile terminal 70 is less than the battery capacity measuring reference value, the setting unit 11 re-sets a cell size measuring reference value for measuring connectable cells in accordance with the cell information received through the communication module 20. That is, when the residual amount of the battery capacity is less than the battery capacity measuring reference value, the setting unit 11 re-sets a cell size measuring reference so that cells of low priorities having regions larger than or equal to the region of the connected cell are measured to reduce the number of times of re-selecting a cell and to thus reduce the consumption amount of the battery capacity of the mobile terminal.

For example, in the case where the cell to which the mobile terminal 70 is currently connected is a pico cell, the setting unit 11 re-sets the cell size measuring reference so that micro cells or macro cells of low priorities having radiuses larger than the radius of the pico cell to which the mobile terminal is connected are measured when the residual amount of the battery capacity of the mobile terminal is less than the battery capacity measuring reference value.

On the other hand, when it is determined that the residual amount of the battery capacity of the mobile terminal is more than the battery capacity measuring reference value, the setting unit 11 re-sets the cell size measuring reference so that cells of high priorities having regions smaller than or equal to the region of the connected cell are measured to improve the intensity of the receiving signal or the data transmission rate of the cell.

For example, in the case where the cell to which the mobile terminal is currently connected is a macro cell, the setting unit 11 re-sets the cell size measuring reference so that micro cells or pico cells of high priorities having radiuses smaller than the radius of the macro cell that is the connected cell are measured when the residual amount of the battery capacity of the mobile terminal is more than the battery capacity measuring reference value.

When it is determined that the residual amount of the battery capacity is less than the battery capacity measuring reference value in accordance with the cell size measuring reference re-set by the setting unit 11, the data processor 12 evaluates cells of priorities equal to or lower than the priority of the connected cell in accordance with the re-set cell size measuring reference to re-select a connected cell among the measured cells.

When the intensity of the receiving signal of the connected cell is less than the intensity threshold value, the data processor 12 re-selects a connected cell among the measured cells. For example, in the case where the currently connected cell is C1, a cell including the cell C1 and having a region larger than the region of the cell C1 is C2, and a cell adjacent to the cell C2 and having a region equal to the region of the cell C1 is C3, when it is determined by the determining unit 30 that the residual amount of the battery capacity of the mobile communication terminal is less than the battery capacity measuring reference value, the data processor 12 re-selects the cell C2 as a connected cell.

Herein, when it is determined that the intensity of the receiving signal of the cell C2 is less than the intensity threshold value, the data processor 12 re-selects the cell C3 adjacent to the cell C2 and having a region equal to the region of the cell C1 as a connected cell.

In another embodiment of the present invention, the setting unit 11 sets the cell size measuring reference so that cells of priorities higher than the priority of the connected cell are measured when it is determined by the determining unit 30 that the mobile terminal moves at low speed and that cells of priorities lower than the priority of the connected cell are measured when it is determined by the determining unit 30 that the mobile terminal moves at high speed.

The data processor 12 re-selects a cell selected among the cells of priorities higher than or equal to the priority of the connected cell as a connected cell when it is determined that the mobile terminal moves at low speed in accordance with the cell size measuring reference re-set by the setting unit 11 and re-selects a cell selected among the cells of priorities lower than or equal to the priority of the connected cell as a connected cell when it is determined that the mobile terminal moves at high speed in accordance with the cell size measuring reference re-set by the setting unit 11.

By way of example and as illustrated in FIG. 4, the mobile terminal 70 determines a cell C1 having the smallest radius as a cell having the highest priority 3 (prio:3) and determines a cell C2 having a radius larger than the radius of the cell C1 as a cell having the next highest priority 2 (prio:2). The mobile terminal determines a cell C3 having the largest radius as a cell having the lowest priority 1 (prio:1).

As illustrated in FIG. 5, a HCS including a plurality of cells having different priorities includes a cell C1 to which the mobile terminal 70 is connected, cells C2, C3, and C4 adjacent to the cell C1 and having the same priorities, a cell C5 including the cells C1, C2, and C3 and having a low priority and a region larger than the regions of the cells C1, C2, and C3, and a cell C6 including the cells C3 and C4 and having a low priority and a region larger than the regions of the cells C3 and C4.

During a change in position from the cell C1 to the cell C4, the mobile terminal 70 does not re-select a cell among the cells C2, C3, and C4, but determines the residual amount of the battery capacity of the mobile terminal 70 to measure the cells C5 and C6 of low priorities having radiuses larger than the radius of the cell C1 and to re-select the cell C5 whose receiving signal has a larger intensity as a connected cell between the measured cells C5 and C6 when it is determined that the residual amount of the battery capacity of the mobile terminal is less than the battery capacity measuring reference value.

In another example, during change in position from the cell C1 to the cell C4, the mobile terminal re-selects the cell C6 including the cell C4 as a connected cell between the cells C5 and C6 measured in accordance with the set cell size measuring reference so that it is possible to reduce the number of times of re-selecting a cell in accordance with movement in position.

A method of operating the mobile terminal according to the present invention of the above-described structure will be described with reference to FIGS. 6 and 7.

As illustrated in FIG. 6, cell information received from a plurality of cells adjacent to the mobile terminal is read and the read cell information is stored in a memory (S101). The mobile terminal measures a residual amount of a battery capacity (S102) to re-set a cell size measuring reference in accordance with the measured residual amount of the battery capacity (S103 to S105). At this time, the intensity of the receiving signal and the data transmission rate of the cell of the mobile terminal are determined to re-select a cell (S107 to S109).

The residual amount of the battery capacity of the mobile terminal is compared with the previously set battery capacity measuring reference value and, when it is determined that the residual amount of the battery capacity is more than the battery capacity measuring reference value (S103), a cell size measuring reference is re-set so that cells having priorities higher than or equal to the priority of the currently connected cell are measured (S104) and connectable cells are measured in accordance with the re-set cell size measuring reference (S106).

On the other hand, when it is determined that the residual amount of the battery capacity of the mobile terminal is less than the battery capacity measuring reference value (S103), a cell size measuring reference is re-set so that cells having priorities lower than or equal to the priority of the currently connected cell are measured (S105) and connectable cells are measured in accordance with the re-set cell size measuring reference (S106).

When the intensity of the receiving signal of the cell to which the mobile terminal is connected is more than the intensity threshold value (S107) and the data transmission rate of the cell to which the mobile terminal is connected is more than the data transmission rate threshold value (S108), connection to the currently connected cell is maintained and data are transmitted to and received from the connected cell (S110). When the intensity of the receiving signal of the connected cell is less than the intensity threshold value (S107) and the data transmission rate of the cell to which the mobile terminal is connected is more than the data transmission rate threshold value (S108), a cell is re-selected among a plurality of cells measured in accordance with the cell size measuring reference (S109) and the mobile terminal 70 is connected to the re-selected cell to transmit data to and receive data from the connected cell (S110).

Furthermore, the cell whose receiving signal has the largest intensity is re-selected between the cells of the lowest priorities selected among the plurality of cells measured in accordance with the cell size measuring reference.

In a method of operating a mobile terminal according to another embodiment of the present invention, as illustrated in FIG. 7, during a change in the cell position of the mobile terminal, a cell is re-selected among the measured cells in accordance with whether an internal trigger is generated by the high speed movement of the mobile terminal 70.

The determining unit 30 determines whether the internal trigger is generated by the high speed movement of the mobile terminal (S211) and, when it is determined that the internal trigger is not generated, a cell size measuring reference is set so that cells of priorities higher than or equal to the priority of the currently connected cell are measured (S213).

Cells of priorities higher than or equal to the priority of the connected cell are measured among the cells adjacent to the connected cell in accordance with the set cell size measuring reference (S214).

On the other hand, when it is determined that the internal trigger is generated by the high speed movement of the mobile terminal (S211), a cell size measuring reference is re-set so that cells of priorities lower than or equal to the priority of the connected cell are measured (S212). The mobile terminal 70 measures cells of priorities lower than or equal to the priority of the connected cell among the cells adjacent to the connected cell in accordance with the set cell size measuring reference (S214).

The intensities of the receiving signals of the connected cell and the other measured cells are determined in accordance with the change in the position of the mobile terminal. When it is determined that the intensity of the receiving signal of the connected cell is more than the intensity threshold value (S215), connection to the currently connected cell is maintained and data are transmitted to and received from the connected cell (S217). When it is determined that the intensity of the receiving signal of the connected cell is less than the intensity threshold value (S215), a cell is re-selected among the plurality of cells measured in accordance with the cell size measuring reference (S216) and the mobile terminal is connected to the re-selected cell to transmit data to and receive data from the connected cell (S217).

As described above, in the mobile terminal capable of re-selecting the cell in accordance with the residual amount of the battery capacity of the present invention and the method of operating the same, the cell is re-selected in accordance with the information received from the connected cell or the cells adjacent to the connected cell and the cell size measuring reference is re-set so that the cells of low priorities are measured in accordance with the residual amount of the battery capacity. Therefore, it is possible to reduce the number of times of re-selecting the cell and to thus reduce the consumption amount of the battery capacity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal for receiving information, comprising:
   an input unit adapted to receive data;
   a communication module adapted to receive cell information related to a hierarchical cell structure (HCS) priority for a plurality of adjacent connectable cells, and to transmit the data to a connected cell and receive the data from the connected cell;
   a memory unit adapted to store the cell information received in the communication module;
   a determining unit adapted to determine a receiving signal intensity level of the connected cell, the HCS priority of the plurality of adjacent connectable cells when the cell information is received, and a residual amount of battery capacity of the mobile terminal; and
   a controller adapted to compare the residual amount of battery capacity with a battery capacity measuring reference value, reset a cell size measuring reference based on a result of the comparison, and measure at least one of the plurality of adjacent connectable cells in accordance with the cell size measuring reference, wherein the controller is further adapted to re-select a connected cell among the measured cells according to the received cell information if a received signal strength of the connected cell is less than an intensity threshold value, such that the mobile communication terminal is connected to the re-selected cell.

2. The mobile terminal of claim 1, wherein the HCS priority of the plurality of adjacent connectable cells is determined in accordance with a plurality of radiuses of the plurality of adjacent connectable cells based on the connected cell.

3. The mobile terminal of claim 2, wherein the cells of regions having radiuses larger than a radius of the region of the connected cell are determined to have low priorities and cells of regions having radiuses smaller than the radius of the region of the connected cell are determined to have high priorities.

4. The mobile terminal of claim 1, wherein the controller comprises:
   a setting unit adapted for re-setting the cell size measuring reference for measuring connectable cells in accordance with the received cell information and the residual amount of the battery capacity; and
   a data processor for re-selecting the connected cell among the measured cells in accordance with the re-set cell size measuring reference.

5. The mobile terminal of claim 4, wherein the setting unit sets the cell size measuring reference so that cells having priorities either higher than or lower than the priority of the connected cell are measured in accordance with the residual amount of the battery capacity.

6. The mobile terminal of claim 5, wherein when the residual amount of the battery capacity is less than the battery capacity measuring reference value, the setting unit sets the cell size measuring reference so that cells of priorities lower than or equal to the priority of the connected cell are measured.

7. The mobile terminal of claim 5, wherein when the residual amount of the battery capacity is more than the battery capacity measuring reference value, the setting unit sets the cell size measuring reference so that cells of priorities higher than the priority of the connected cell are measured.

8. The mobile terminal of claim 5, wherein when the mobile terminal moves at a high speed, the setting unit sets the cell size measuring reference so that cells of priorities lower than the priority of the connected cell are measured.

9. The mobile terminal of claim 5, wherein when the mobile terminal moves at a low speed, the setting unit sets the cell size measuring reference so that cells of priorities higher than the priority of the connected cell are measured.

10. The mobile terminal of claim 4, wherein the data processor evaluates cells of priorities lower than the priority of the connected cell among the plurality of adjacent connectable cells in accordance with the cell size measuring reference.

11. The mobile terminal of claim 10, wherein when the received signal strength of the connected cell is less than the intensity threshold value, the data processor re-selects the connected cell among the measured cells.

12. The mobile terminal of claim 11, wherein the data processor re-selects the connected cell among cells of low priorities selected among the measured cells.

13. The mobile terminal of claim 1, wherein the determining unit is further adapted to determine a data transmission rate of the connected cell.

14. The mobile terminal of claim 10, wherein when the determining unit determines that an internal trigger is not generated by the high speed movement of the mobile terminal and the residual amount of battery capacity is less than the battery capacity measuring reference value, the data processor evaluates at least one cell of the plurality of adjacent connectable cells.

15. A method for re-selecting a cell for operating a mobile terminal in accordance with a residual amount of battery capacity, the method comprising:
    receiving cell information related to a hierarchical cell structure (HCS) priority for a plurality of adjacent connectable cells;
    measuring the residual amount of battery capacity;
    comparing the residual amount of battery capacity with a battery capacity measuring reference value;
    re-setting a cell size measuring reference based on the result of the comparison;
    measuring whichever of cells adjacent to a currently connected cell can be connected in accordance with the cell size measuring reference;
    re-selecting a cell among the measured cells and connecting the mobile communication terminal to the re-selected cell if a received signal strength of the currently connected cell is less than a threshold; and
    communicating with the re-selected cell for transmitting and receiving data.

16. The method of claim 15, wherein the step of re-setting the cell size measuring reference further comprises the step of measuring cells having priorities lower than a priority of the currently connected cell when it is determined that the residual amount of the battery capacity is less than the battery capacity measuring reference value.

17. The method of claim 15, wherein the step of re-setting the cell size measuring reference further comprises the step of measuring cells having priorities higher than the priority of the currently connected cell when it is determined that the residual amount of the battery capacity is more than the battery capacity measuring reference value.

18. The method of claim 15, wherein the step of re-selecting the cell among the measured cells comprises the step of comparing a receiving signal intensity level of the currently connected cell with a previously set intensity threshold value.

19. The method of claim 18, wherein when it is determined that the receiving signal intensity level of the currently connected cell is less than the previously set intensity threshold value, the cell is re-selected among the measured cells.

20. The method of claim 15, further comprising the step of receiving information from cells adjacent to the currently connected cell for reading and storing the received cell information.

21. The method of claim 20, further comprising the step of determining cell priorities in accordance with the received cell information.

22. A method for re-selecting a cell for operating a mobile terminal in accordance with a residual amount of a battery capacity, the method comprising:
    measuring a residual amount of the battery capacity when an internal trigger is not generated by movement of the mobile terminal;
    comparing the residual amount of the battery capacity with a battery capacity measuring reference value;
    re-setting a cell size measuring reference based on the result of the comparison, and measuring whichever of cells adjacent to a currently connected cell can be connected in accordance with the cell size measuring reference; and
    re-selecting a cell among the measured cells and connecting the mobile communication terminal to the re-selected cell if a received signal strength of the currently connected cell is less than a threshold.

23. The method of claim 22, wherein the step of re-setting the cell size measuring reference further comprises the step of measuring cells having priorities lower than the priority of the currently connected cell when it is determined that the residual amount of the battery capacity is less than the battery capacity measuring reference value and measuring cells of priorities higher than the priority of the currently connected cell when it is determined that the residual amount of the battery capacity is more than the battery capacity measuring reference value.

24. The method of claim 22, wherein the step of reselecting the cell among the measured cells comprises the step of comparing a receiving signal intensity of the currently connected cell with a previously set intensity threshold value.

25. The method of claim 24, wherein when it is determined that the receiving signal intensity of the currently connected cell is less than the previously set intensity threshold value, the cell is re-selected among the measured cells.

26. The method of claim 22, further comprising the step of receiving information on cells adjacent to the currently connected cell to read the received information.

27. The method of claim 26, further comprising the step of determining cell priorities in accordance with the received information.

* * * * *